United States Patent [19]

Testa

[11] Patent Number: 5,692,454
[45] Date of Patent: Dec. 2, 1997

[54] BIRDBATH

[76] Inventor: William C. Testa, 19 Clifford Pl., East Norwich, N.Y. 11732

[21] Appl. No.: 555,108

[22] Filed: Nov. 8, 1995

[51] Int. Cl.$^6$ .................................................. A01K 7/02
[52] U.S. Cl. .................................................. 119/69.5
[58] Field of Search .................... 119/69.5, 72, 73, 119/74, 75

[56] References Cited

U.S. PATENT DOCUMENTS

| | | | |
|---|---|---|---|
| 2,878,781 | 3/1959 | Wingfield | 119/72 |
| 4,300,537 | 11/1981 | Davis | 126/437 |
| 4,508,124 | 4/1985 | Franzino | 132/277 |
| 4,630,569 | 12/1986 | Dieleman | 119/69.5 |
| 4,744,334 | 5/1988 | McAnally | 119/78 |

FOREIGN PATENT DOCUMENTS

| | | | |
|---|---|---|---|
| 2627664 | 9/1989 | France | 119/72 |
| 3509305 | 9/1986 | Germany | 119/73 |

Primary Examiner—Thomas Price
Attorney, Agent, or Firm—Michael I. Kroll

[57] ABSTRACT

An improved birdbath which comprises a basin to hold water therein for birds to bathe in. A pedestal is under the basin. The pedestal sits upon the ground, so as to elevate the basin above the ground. A water circulating system is built into the pedestal, so as to recycle the water within the basin and attract birds thereto. A facility is for supplying electrical power to the water circulating system, so that the water circulating system can operate.

15 Claims, 2 Drawing Sheets

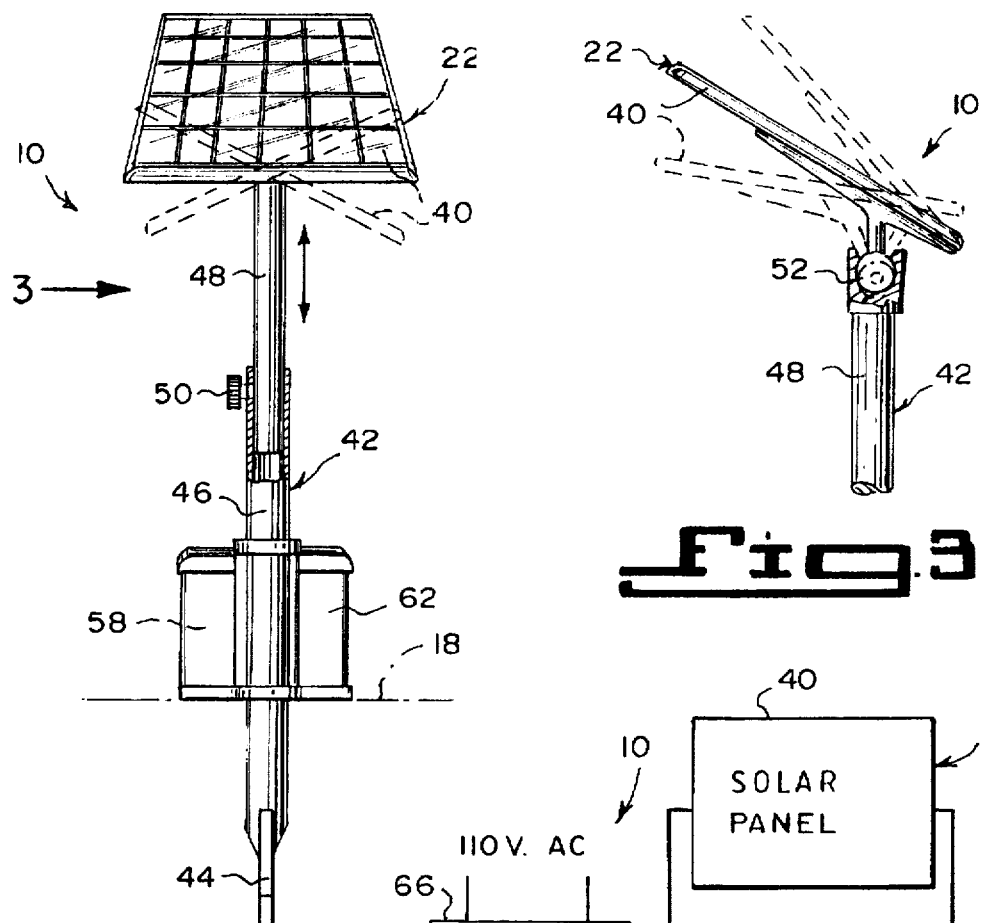
Fig.2
Fig.3
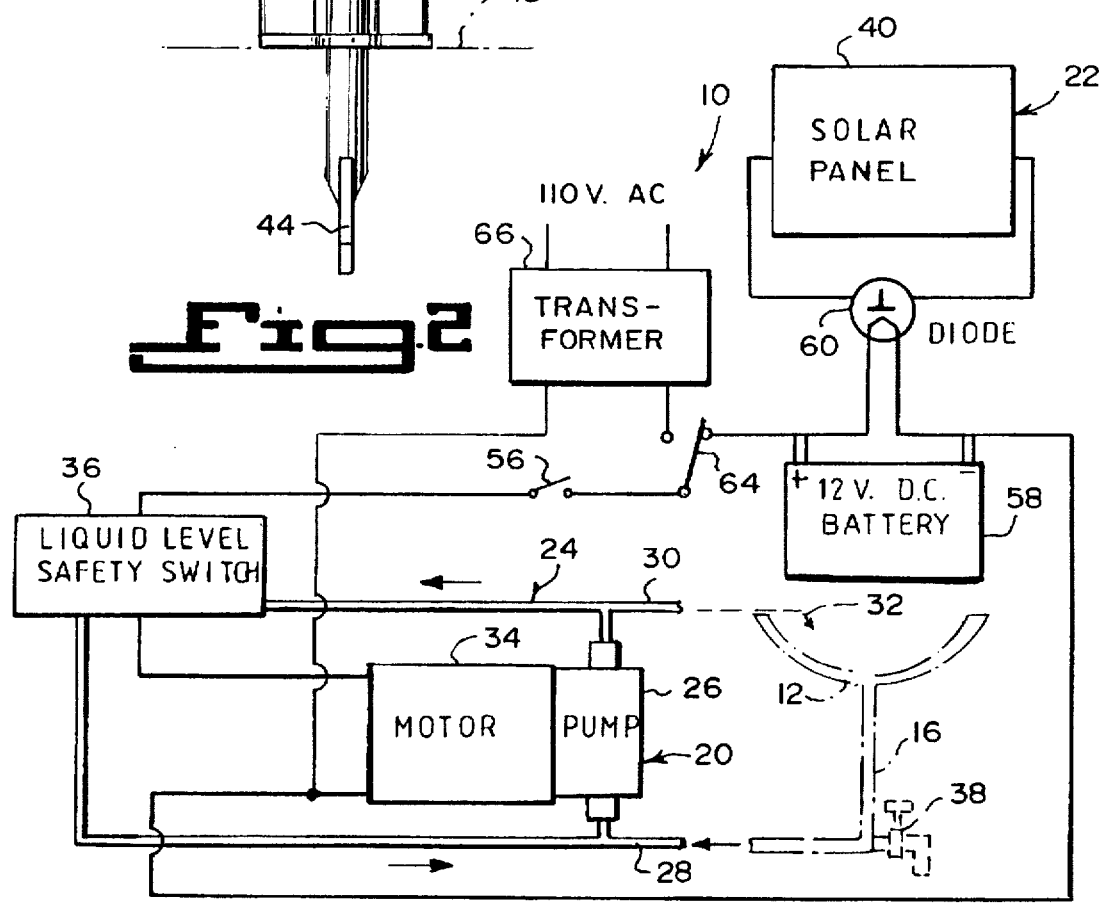
Fig.4

5,692,454

1

BIRDBATH

BACKGROUND OF THE INVENTION

1. Field of the Invention

The instant invention relates generally to birdbaths and more specifically it relates to an improved birdbath.

2. Description of the Prior Art

Numerous birdbaths have been provided in prior art that are basins filled with water for birds to bathe in. While these units may be suitable for the particular purpose to which they address, they would not be as suitable for the purposes of the present invention as heretofore described.

SUMMARY OF THE INVENTION

A primary object of the present invention is to provide an improved birdbath that will overcome the shortcomings of the prior art devices.

Another object is to provide an improved birdbath that will contain a water circulating system, whereby the running water will attract birds thereto.

An additional object is to provide an improved birdbath in which a re-circulating water pump in the water circulating system can be operated by either solar power, a battery or house current.

A further object is to provide an improved birdbath that is simple and easy to use.

A still further object is to provide an improved birdbath that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 2 is an elevational view taken in the direction of arrow 2 in FIG. 1, with parts broken away and in section.

FIG. 3 is a side view taken in the direction of arrow 3 in FIG. 2, with parts broken away and in section.

FIG. 4 is a schematic block diagram of the hydraulic and electrical circuitry of the instant invention.

Similar reference characters denote corresponding features consistently throughout the attached drawings.

DETAILED DESCRIPTION OF THE PREFERRED EMBODIMENTS

Figure 1:
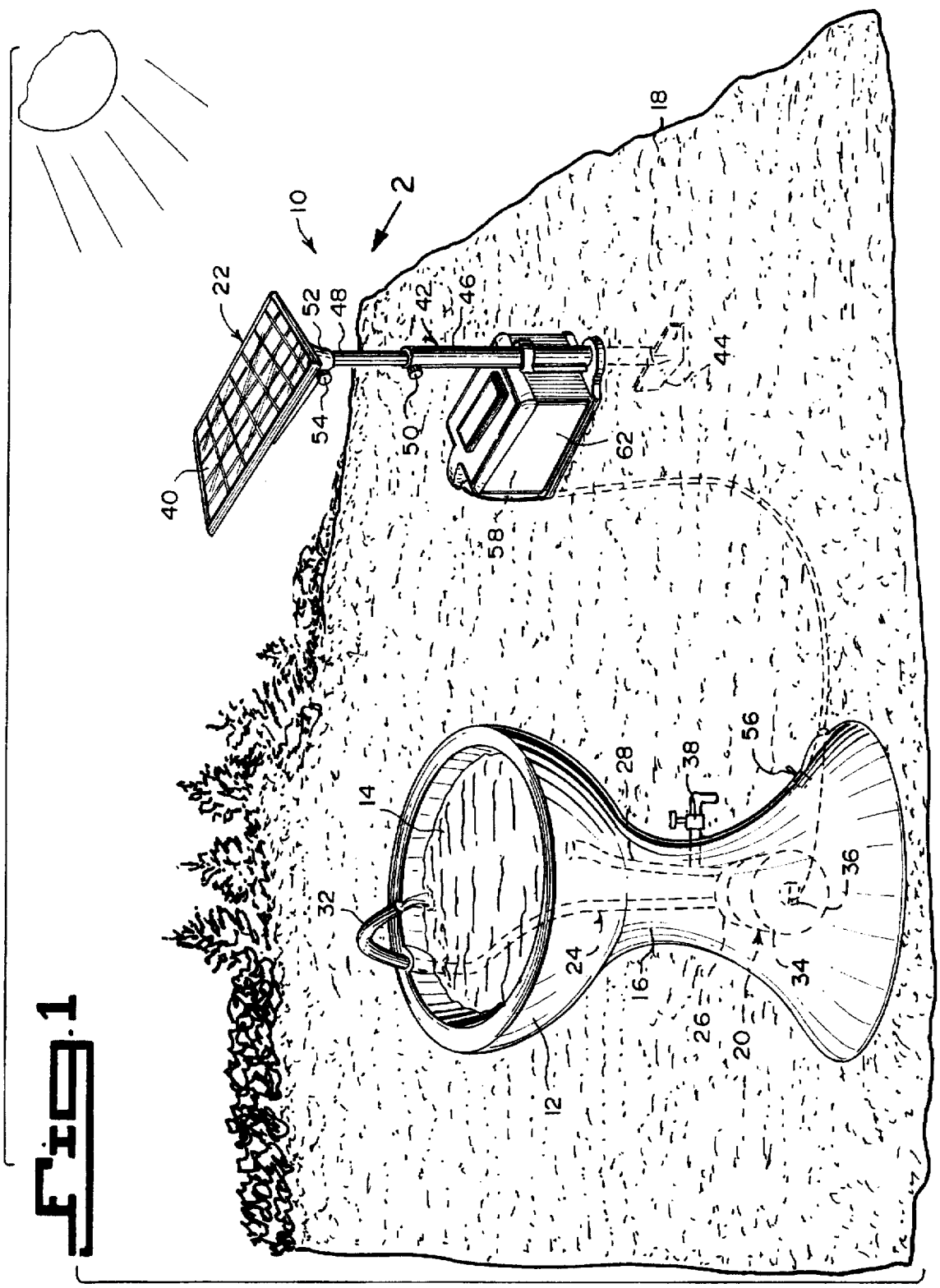
FIG. 1 is a perspective view of the instant invention in use.

Turning now descriptively to the drawings, in which similar reference characters denote similar elements throughout the several views, FIGS. 1 through 4 illustrate an improved birdbath 10, which comprises a basin 12 to hold water 14 therein for birds to bathe in. A pedestal 16 is under the basin 12. The pedestal 16 sits upon the ground 18, so as to elevate the basin 12 above the ground 18. A water circulating system 20 is built into the pedestal 16, so as to recycle the water 14 within the basin 12 and attract birds thereto. A facility 22 is for supplying electrical power to the water circulating system 20, so that the water circulating system 20 can operate.

The water circulating system 20 includes an hydraulic circuit 24 extending to the basin 12. A water pump 26 is fluidly connected into the hydraulic circuit. The hydraulic circuit 24 consists of a drainpipe 28 extending from the bottom of the basin 12 to the water pump 26. A refill pipe 30 extends from the water pump 26 to the basin 12. Water 14 will flow from a curved free end 32 of the refill pipe 30, which is slightly elevated on the basin 12 back into the basin 12.

The water circulating system 20 further includes an electric motor 34 to drive the water pump 26. A liquid level safety switch 36 is electrically connected between the electrical power supplying facility 22 and the electric motor 34. The liquid level safety switch 36 is also fluidly connected to the water pump 26 via the hydraulic circuit 24 of the water circulating system 20. The liquid level safety switch 36 will shut down the water pump 26, when the water 14 within the basin 12 is eliminated therefrom. A drain valve 38 is fluidly connected to the drain pipe 28 of the hydraulic circuit 24, so that the basin 12 can be drained of water 14 when needed.

The electrical power supplying facility 22 includes a solar panel 40 that is electrically connected between the electric motor 34 and the liquid level safety switch 36. A stanchion 42 is for supporting the solar panel 40. A stake 44 on a bottom end of the stanchion 42 is for securing the stanchion 42 to the ground 18, so that the stanchion 42 can elevate the solar panel 40 above the ground 18.

The stanchion 42 is height adjustable and consists of a lower hollow stationary post 46. An upper telescopic post 48 fits into the lower hollow stationary post 46. A setscrew 50 threads into the lower hollow stationary post 46 and engages with the upper telescopic post 48, to retain it in a stationary position.

The solar panel 40 is angle adjustable and includes a universal joint 52 between a bottom surface of the solar panel 40 and a top end of the stanchion 42. A setscrew 54 threads into the universal joint 52, so as to retain the solar panel 40 in a stationary position.

The electrical power supplying facility 22 further contains an on/off switch 56 electrically connected between the solar panel 40 and the liquid level safety switch 36. A rechargeable battery 58 is also provided. A diode 60 is electrically connected between the solar panel 40 and the battery 58. The solar panel 40 can charge the battery 58 through the diode 60. The battery 58 can supply electrical power directly to the liquid level safety switch 36 and the electric motor 34, when the solar panel 40 is not functioning, such as at night or during inclement weather.

A battery tray box 62 is connected to the stanchion 42. The battery tray box 62 is for holding the battery 58 therein and to protect the battery 58. The electrical power supplying facility 22, as shown in FIG. 4, can contain a two-way switch 64 electrically connected between the battery 58 and the on/off switch 56. A transformer 66 is electrically connected between the two-way switch 64 and the electric motor 34. The transformer 66 is electrically connected to house current being 110 volts AC. When the two-way switch 64 is set in a first position, the battery 58 and solar panel 40 can supply the electrical power.

When the two-way switch 64 is set in a second position, the transformer 66 can supply the electrical power.

LIST OF REFERENCE NUMBERS 10 improved birdbath
12 basin of 10
14 water in 12
16 pedestal of 10
18 ground
20 water circulating system of 10
22 electrical power supplying facility of 10
24 hydraulic circuit of 20
26 water pump of 20
28 drainpipe of 24
30 refill pipe of 24
32 curved free end of 30
34 electric motor for 26
36 liquid level safety switch of 20
38 drain valve
40 solar panel of 22
42 stanchion for 40
44 stake on 42
46 lower hollow stationary post of 42
46 upper telescopic post of 42
48 setscrew for 52
50 universal joint between 40 and 42
54 setscrew for 52
56 on/off switch of 22
58 rechargeable battery of 22
60 diode of 22
62 battery tray box on 42 for 58
64 two-way switch of 22
66 transformer of 22

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An improved birdbath which comprises:
   a) a basin to hold water therein for birds to bathe in;
   b) a pedestal under said basin, wherein said pedestal sits upon the ground, so as to elevate said basin above the ground;
   c) a water circulating system built into said pedestal, so as to recycle the water within said basin and attract birds thereto, said water circulating system including:
      i) an hydraulic circuit extending to said basin;
      ii) a water pump fluidly connected to said hydraulic circuit and;
      iii) an electric motor to drive said water pump;
   d) means for supplying electrical power to said water circulating system, so that said water circulating system can operate;
   e) a liquid level safety switch electrically connected between said electrical power supplying means and said electric motor, said liquid level safety switch fluidly connected to said water pump via said hydraulic circuit of said water circulating system, whereby said liquid level safety switch will shut down said water pump when the water within said basin is eliminated therefrom;
   f) a solar panel electrically connected between said electric motor and said liquid level saftey switch;
   g) a stanchion supporting said solar panel; and
   h) a stake on a bottom end of said stanchion securing said stanchion to the ground, so that said stanchion can elevate said solar panel above the ground.

2. An improved birdbath as recited in claim 1, wherein said hydraulic circuit includes:
   a) a drainpipe extending from the bottom of said basin to said water pump; and
   b) a refill pipe extending from said water pump to said basin, so that water will flow from a curved free end of said refill pipe which is slightly elevated on said basin back into said basin.

3. An improved birdbath as recited in claim 2, wherein said water circulating system further includes a drain valve fluidly connected to said drain pipe of said hydraulic circuit, so that said basin can be drained of water when needed.

4. An improved birdbath as recited in claim 3, wherein said stanchion is height adjustable and includes:
   a) a lower hollow stationary post;
   b) an upper telescopic post which fits into said lower hollow stationary post; and
   c) a setscrew which threads into said lower hollow stationary post and engages with said upper telescopic post to retain it in a stationary position.

5. An improved birdbath as recited in claim 4, wherein said solar panel is angle adjustable and includes:
   a) a universal joint between a bottom surface of said solar panel and a top end of said stanchion; and
   b) a setscrew which threads into said universal joint, so as to retain said solar panel in a stationary position.

6. An improved birdbath as recited in claim 5, wherein said electrical power supplying means further includes an on/off switch electrically connected between said solar panel and said liquid level safety switch.

7. An improved birdbath as recited in claim 6, wherein said electrical power supplying means further includes:
   a) a rechargeable battery; and
   b) a diode electrically connected between said solar panel and said battery, so that said solar panel can charge said battery through said diode, while said battery can supply electrical power directly to said liquid level safety switch and said electric motor, when said solar panel is not functioning, such as at night or during inclement weather.

8. An improved birdbath as recited in claim 7, further comprising a battery tray box connected to said stanchion, said battery tray box is for holding said battery therein and to protect said battery.

9. An improved birdbath as recited in claim 8, wherein said electrical power supplying means further includes:
   a) a two-way switch electrically connected between said battery and said on/off switch; and b) a transformer electrically connected between said two-way switch and said electric motor, said transformer is electrically connected to house current being 110 volts AC, so that when said two-way switch is set in a first position, said battery and solar panel can supply the electrical power, and when said two-way switch is set in a second position, said transformer can supply the electrical power.

10. An improved birdbath as recited in claim 1, wherein said stanchion is height adjustable and includes:

a) a lower hollow stationary post;

b) an upper telescopic post which fits into said lower hollow stationary post; and c) a setscrew which threads into said lower hollow stationary post and engages with said upper telescopic post to retain it in a stationary position.

11. An improved birdbath as recited in claim 1, wherein said solar panel is angle adjustable and includes:

a) a universal joint between a bottom surface of said solar panel and a top end of said stanchion; and b) a setscrew which threads into said universal joint, so as to retain said solar panel in a stationary position.

12. An improved birdbath as recited in claim 1, wherein said electrical power supplying means further includes an on/off switch electrically connected between said solar panel and said liquid level safety switch.

13. An improved birdbath as recited in claim 12, wherein said electrical power supplying means further includes:

a) a rechargeable battery; and b) a diode electrically connected between said solar panel and said battery, so that said solar panel can charge said battery through said diode, while said battery can supply electrical power directly to said liquid level safety switch and said electric motor, when said solar panel is not functioning, such as at night or during inclement weather.

14. An improved birdbath as recited in claim 13, further comprising a battery tray box connected to said stanchion, said battery tray box is for holding said battery therein and to protect said battery.

15. An improved birdbath as recited in claim 12, wherein said electrical power supplying means further includes:

a) a two-way switch electrically connected between said battery and said on/off switch; and b) a transformer electrically connected between said two-way switch and said electric motor, said transformer is electrically connected to house current being 110 volts AC, so that when said two-way switch is set in a first position, said battery and solar panel can supply the electrical power, and when said two-way switch is set in a second position, said transformer can supply the electrical power.

* * * * *